Patented July 24, 1928.

1,678,599

UNITED STATES PATENT OFFICE.

LEOPOLD LASKA AND ARTHUR ZITSCHER, OF OFFENBACH-ON-THE MAIN, GERMANY, ASSIGNORS TO GRASSELLI DYESTUFF CORPORATION, OF NEW YORK, N. Y., A CORPORATION OF DELAWARE.

AZO-DYESTUFFS FROM 2-3-HYDROXYNAPHTHOIC ACID ARYLIDES AND PROCESS OF MAKING THE SAME.

No Drawing.  Application filed May 24, 1926, Serial No. 111,371, and in Germany May 28, 1925.

The present invention relates to new azo dyestuffs from 2-3-hydroxy-naphthoic acid arylides and a process of preparing the same.

We have found that valuable novel azo dyestuffs are obtained if 2.3-hydroxynaphthoic acid arylides are allowed to couple with the diazo compounds obtained from amines of the general type:

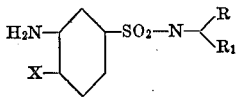

wherein R and $R_1$ represent an alkyl- or an aryl group and X an alkyl- for an alkoxy group.

The most probable graphical representation for our novel dyestuffs is the formula:

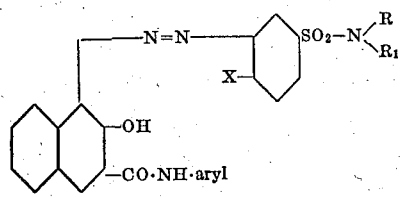

wherein R and $R_1$ represent an alkyl- or an aryl group and X an alkyl- or an alkoxy group. These coloring matters are in the dry state reddish to dark colored powders, which dissolve in concentrated sulfuric acid with from blue to dark violet colors. By reduction the original amines of the aforesaid type are recovered together with 1-amino-2-hydroxynaphthalene-3-carboxylic acid arylides.

The new dyestuffs may be produced either as such or on a base, i. e., on a substratum or on the vegetable fiber. When mixed with or precipitated on substrates these novel dyestuffs produce valuable color lakes. They are furthermore of great interest in the dyeing of vegetable fibres. The dyestuff is in this case directly produced on the fibre, the dyeings obtained are of exceedingly clear shades and particularly fast to kier boiling.

The amines of the aforesaid type may be prepared by causing arylsulfonic acid chlorides further substituted besides by a nitrogroup in the before described manner to react on primary or secondary amines, which may, so far as they belong to the aromatic series, contain further substituents in the aryl residue, and by reducing the nitrocompounds thus obtained.

The following examples will further illustrate our novel process and the products obtained by it. We wish it however to be understood that we are not limited to the particular conditions nor to the specific products mentioned therein. The parts are by weight.

Example 1.

13.8 parts of 2-amino-toluene-4-sulfo-N-methylanilide are thoroughly stirred up with 23.2 parts of hydrochloric acid (spec. grav. 1.160), 75 parts of water and ice are added, and then diazotized with a solution of 3.5 parts of sodium nitrite in 15 parts of water. To this solution a solution of 16.5 parts of 2.3-hydroxynaphthoyl-α-naphthylamine in 14 parts of caustic soda (36° Bé.), 1 part of Turkey-red oil, 6 parts of crystal sodium acetate is run in. The coupling is finished after several hours stirring. The dyestuff is thus obtained in the form of a brilliant red paste. When mixed with the usual substrates it forms valuable bluish red lakes. After drying it dissolves in concentrated sulfuric acid with a bluish wine red color and has most probably the formula:

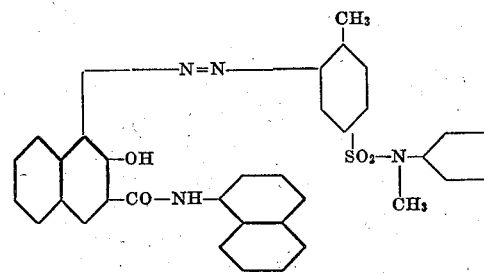

Example 2.

Well boiled out and dried yarn is impregnated with a solution containing per liter 10 gr. of 2.3-hydroxy-naphthoyl-4-phenetidine, 15 cc. of caustic soda (34° Bé.) and 8 cc. of Turkey red oil. It is then well wrung and without drying developed with a solution, containing per liter the diazo compound of 5.5 gr. of 2-amino-toluene-4-sulfo-N-methylanilid which has been neutralized with sodium acetate. After rinsing, soaping and drying the yarn is dyed a clear red shade of a very good fastness to kier boiling. The dyestuff precipitated on the fibre has most probably the formula:

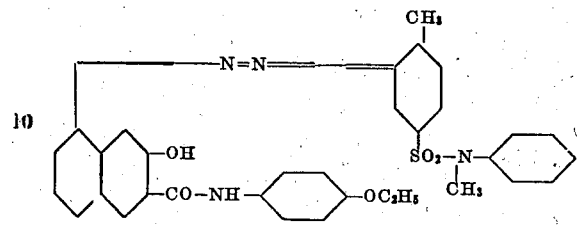

The same shades and fastness properties are obtained by producing the dyestuffs on the fibre by the usual printing processes.

The following table gives the shades obtained on cotton material by using other of our novel azo combinations:

| Diazocompound of: | Combined with 2.3-hydroxynaph-thoyl: | Shades: |
|---|---|---|
| 2-amino-toluene-4-sulfodimethylamid of the formula: 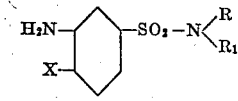 | 4-chloro-2-anisidine. | Clear yellowish red. |
| Do | 2-phenetidine | Clear orange red. |
| Do | α-naphthylamine | Clear red. |
| Do | β-naphthylamine | Fiery scarlet. |
| 2-amino-1-ethoxyphenyl-4-sulfodimethylamid of the formula: 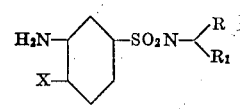 | 4-chloro-2-anisidine. | Bluish red. |
| Do | α-naphthylamine | Bluish red. |
| Do | β-naphthylamine | Bluish red. |
| 2-amino-toluene-4-sulfo-N-methylanilid of the formula: | 3-toluidine | Fiery scarlet. |
| Do | 4-chloroaniline | Fiery scarlet. |
| Do | 5-chloro-2-toluidine. | Clear red. |
| Do | 5-chloro-2-anisidine. | Fiery scarlet. |

We claim:

1. In processes of producing azo dyestuffs from 2.3-hydroxynaphthoic acid arylides the steps comprising diazotizing an amine of the general type:

$$H_2N-\underset{X-}{\bigcirc}-SO_2-N\langle^R_{R_1}$$

wherein R and $R_1$ represent an alkyl- or an aryl group and X an alkyl- or an alkoxy group, and coupling the diazocompound so obtained with a 2.3-hydroxynaphthoic acid arylide.

2. As new products azo dyestuffs having most probably the general formula:

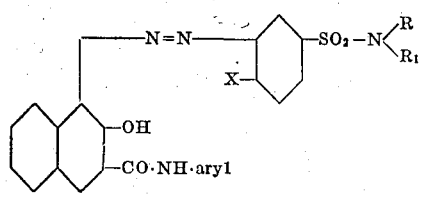

wherein R and $R_1$ represent an alkyl- or an aryl group and X an alykl- or an alkoxy group, which dyestuffs are in the dry state reddish to dark colored powders, soluble in concentrated sulfuric acid with from blue to dark violet colors and which by reduction yield an amine of the type:

$$H_2N-\underset{X-}{\bigcirc}-SO_2N\langle^R_{R_1}$$

wherein R and $R_1$ represent an alkyl- or an aryl group and X an alkyl- or an alkoxy group, and a 1-amino-2-hydroxynaphthalene-3-carboxylic acid arylide, and which when produced on vegetable fibers produce reddish shades of an excellent fastness to kier boiling.

3. Vegetable fibres dyed with the dyestuffs of claim 2.

In testimony whereof, we affix our signatures.

LEOPOLD LASKA.
ARTHUR ZITSCHER.